S. T. STRANG.
Apparatus for Cleaning the Tops of Fruit-Cans.
No. 214,468.  Patented April 15, 1879.
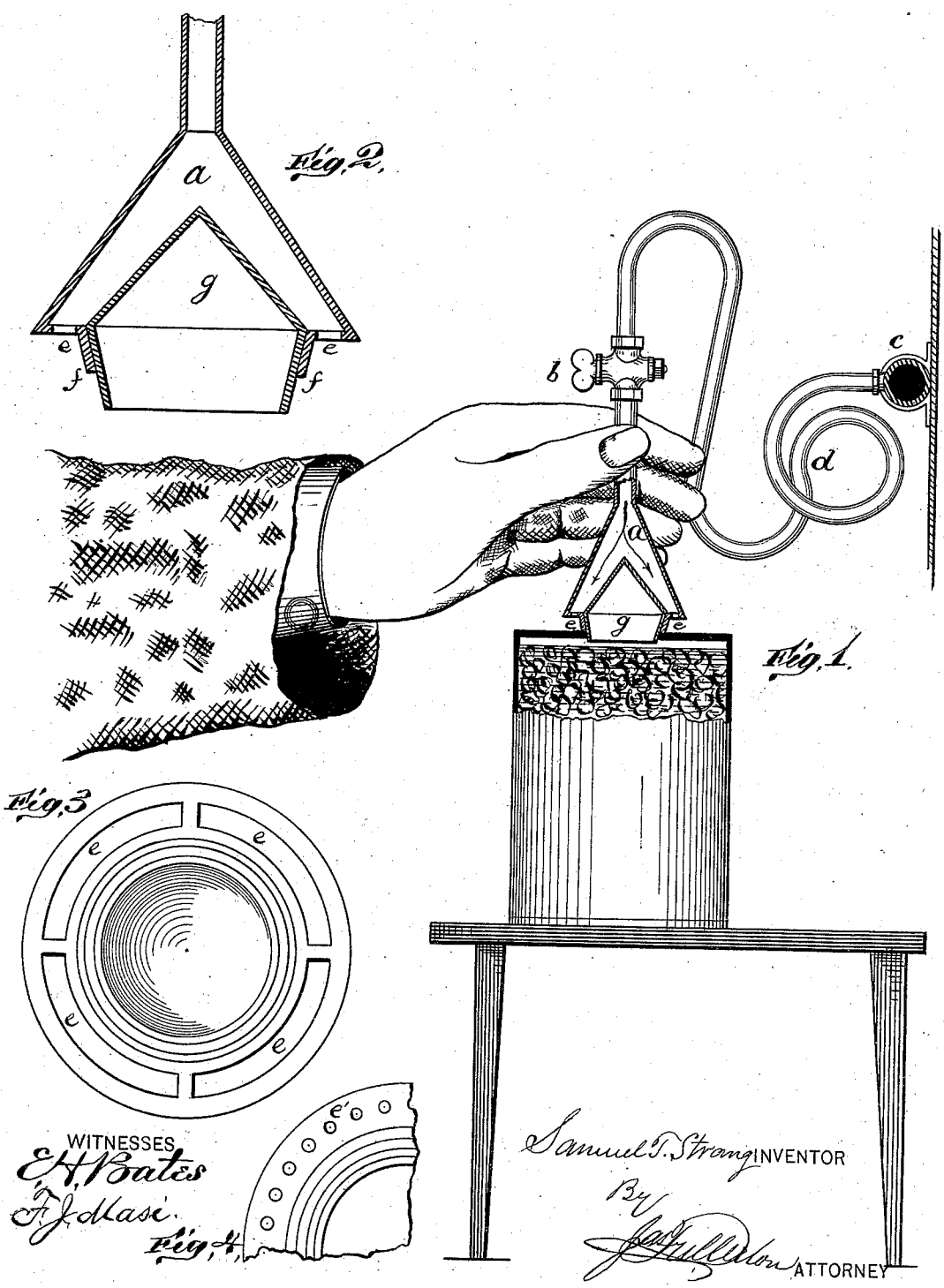

UNITED STATES PATENT OFFICE.

SAMUEL T. STRANG, OF BRIDGETON, NEW JERSEY.

IMPROVEMENT IN APPARATUS FOR CLEANING THE TOPS OF FRUIT-CANS.

Specification forming part of Letters Patent No. 214,468, dated April 15, 1878; application filed September 20, 1878.

*To all whom it may concern:*

Be it known that I, SAMUEL T. STRANG, of Bridgeton, in the county of Cumberland and State of New Jersey, have invented certain new and useful Improvements in Apparatus for Cleaning the Tops of Fruit-Cans; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention relates to an improved apparatus for cleaning the tops of cans, in the process of preserving fruits, vegetables, &c., after the cans have been filled and are ready for the capping or sealing operation.

The object of the invention is to expedite and facilitate the cleaning and capping, and diminish the expense thereof. By the method now used, the top of the can, after it has been filled with the fruit or vegetables, must be cleaned by hand before the cap can be applied and soldered on; but the use of my apparatus enables the capper to perform the work of cleaning more thoroughly and expeditiously by steam.

The invention consists in an apparatus to be attached to a steam-pipe by means of a jointed or flexible tube, which may be readily applied to the top of the can to be cleaned by the capper himself.

To enable others skilled in the art to make and use my invention, I will describe its construction.

Figure 1 is a perspective view, a part being broken away. Fig. 2 is a vertical section. Fig. 3 is a view of the bottom. Fig. 4 is a modification of the bottom.

A hollow metallic cone, *a*, provided with a short pipe and stop-cock, *b*, is attached to a steam-pipe, *c*, by means of a jointed or flexible tube, *d*. The bottom of this cone has openings *e* around the outer edge, by means of which the steam is evenly applied over the top of the can and the cleansing thoroughly effected. These openings may be substituted by perforations, as shown at *e'* in Fig. 4. A smaller cone, *g*, partially closes the bottom of the outer cone, but so projects as to fit into and close the opening in the fruit-can, thereby preventing the entrance of steam while the cleaning process is going on. A flange, *f*, around the projection of this inner cone and the perforated rim of the outer cone rests on the top of the can, and affords ample room for the action of the steam.

The cans being filled with the fruit or vegetables and placed upon the capper's table, he has only to place the apparatus on the top of the can, and the force of the steam will thoroughly effect the removal of all matter interfering with the quick application and soldering on of the cap. One can being cleaned, he has only to remove the apparatus to the next, which will be cleaned while he is affixing the cap to the first.

The short pipe and outer cone may be covered with wood or any non-conducting substance, to protect the hand against the heat of the steam.

Having thus described my invention, I claim as new and desire to secure by Letters Patent—

1. A can-washer having the cones *a* and *g*, provided with the openings or perforations *e*, and the short pipe and stop-cock *b*, substantially as shown and described.

2. The combination, in a can-washer, of the cones *a* and *g*, with the flange *f* and flexible tube *d*, for attachment to a steam-pipe, substantially as described, and for the purposes set forth.

3. In a can-washer, the combination of the cone *a*, provided with the openings *e* and flange *f*, and projecting cone *g* with the tube *d* and a steam-pipe, substantially as described and shown.

In testimony that I claim the foregoing as my own I affix my signature in presence of two witnesses.

SAMUEL T. STRANG.

Witnesses:
JAMES J. REEVES,
MARY W. BISBING.